Oct. 2, 1951     C. FRONDEL     2,569,987
PRESSURE RESPONSIVE TRANSDUCER
Filed Oct. 1, 1948
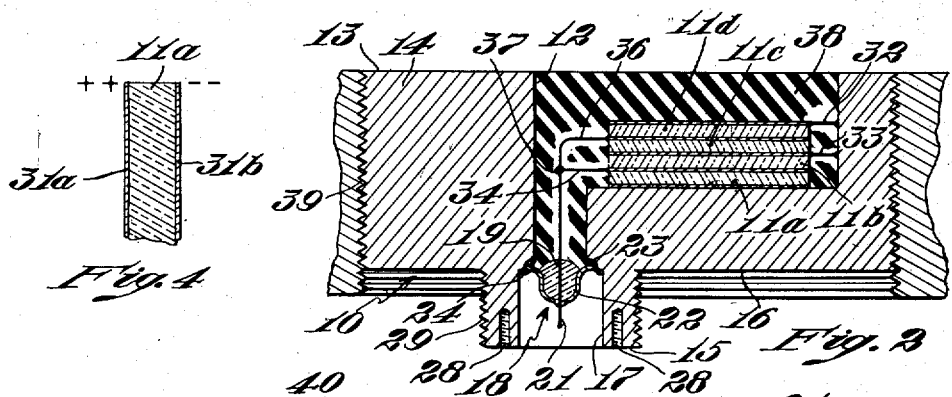
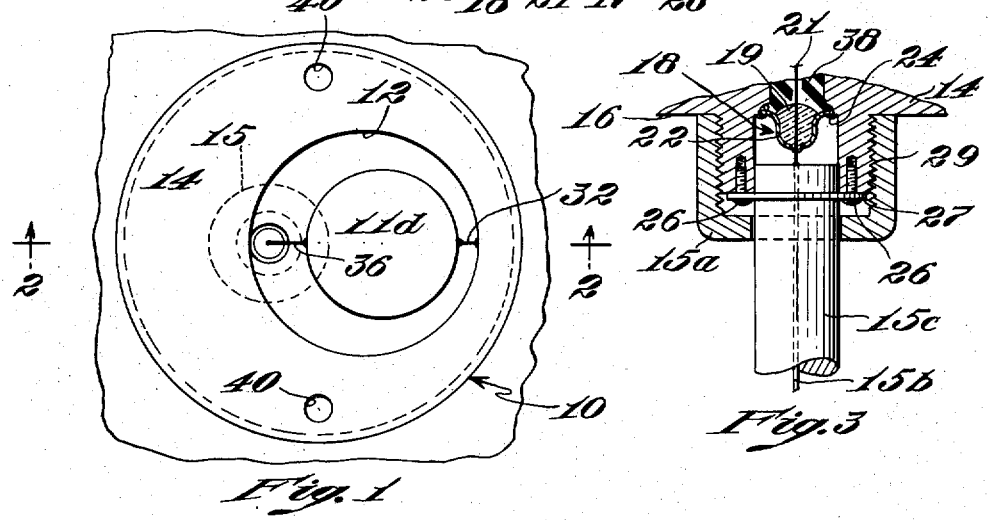
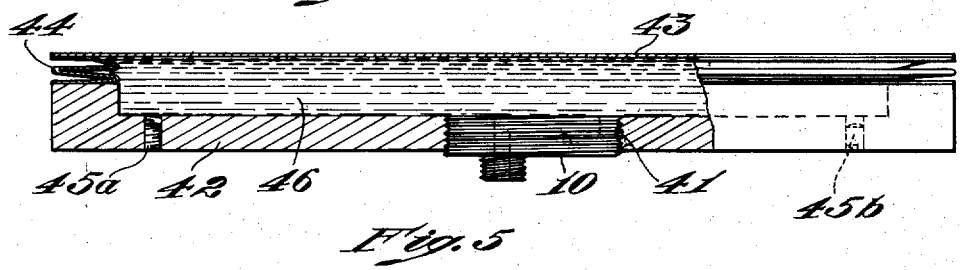
Inventor
Clifford Frondel
by Roberts, Cushman & Grover
Att'ys Patented Oct. 2, 1951

2,569,987

UNITED STATES PATENT OFFICE 2,569,987

PRESSURE RESPONSIVE TRANSDUCER

Clifford Frondel, Cambridge, Mass., assignor to Cambridge Thermionic Corporation, Cambridge, Mass., a corporation of Massachusetts Application October 1, 1948, Serial No. 52,373

6 Claims. (Cl. 177—386)

This invention relates to pressure gauges and more particularly to the type of gauges using piezoelectric elements to measure high amplitude, short duration pressure transients in an adjacent medium.

Objects of this invention are to provide a gauge which measures the duration and amplitude of pressure transients in an adjacent medium, which records the wave shape of the transients, which is accurate, which has an electrical response linearly responsive to variations of pressure in the adjacent medium, which is rugged and requires little maintenance, and which advances the art of gauge manufacture generally.

In a broad aspect the invention contemplates a piezoelectric gauge for measuring pressure transients in an adjacent medium comprising a metal casing having a recess in one wall thereof and a fluid tight connector positioned in another wall of the casing adjoining the recess. A plurality of piezoelectric elements are mounted within the recess and electrically connected in parallel, the terminal of one polarity being linked with the connector and the terminal of the opposite polarity with another connector, for example through ground by fastening to the casing. The casing recess is filled with a wax-like material which seals the piezoelectric elements therein whereby the deformation of the elements by a pressure wave in the fluid adjacent the recessed wall results in an electrical potential between the terminals, the magnitude of which is a function of the amplitude of the pressure wave.

In another aspect the invention contemplates an oil filled housing having an aperture in one end and a diaphragm covering the opposite end thereof. A flexible connection is used to fasten the diaphragm to the housing to permit relative motion therebetween and at the same time retain the oil in the housing. A metal casing having a plurality of piezoelectric elements in a recess in one of its walls is contained in the aperture in the housing. A plurality of piezoelectric elements mounted in the recess are connected in parallel, the terminal of one polarity being linked to a fluid-tight connector positioned in another wall of the casing adjoining the recess, the terminal of opposite polarity being fastened to another connector or to the casing. The elements are sealed in the recess by a wax-like material which fills the recess whereby a pressure wave in the medium adjacent the outer surface of the diaphragm results in an electrical potential between the terminals of the parallel connected piezoelectric elements the magnitude of which is a function of the amplitude of the wave.

In a specific aspect, the gauge comprises a cylindrical metal casing having a recess in one end and an externally threaded nipple projecting normally from the opposite end thereof. The nipple has a centrically located aperture extending to the recess. In the nipple aperture is located a fluid-tight connector having a glass bead with a conductor passing axially therethrough and a metal sleeve fused to the outer surface thereof. The sleeve is fastened to the inner surface of the nipple by means of a fused metal joint. The nipple and conductor are adapted to mate with a coaxial cable connector. In the casing recess are mounted a plurality of piezoelectric plates each having two sides paralleling the recessed end of the case. A silver layer is plated on each of the respective sides which are so arranged that the contacting sides of adjacent plates develop potentials of the same polarity upon change of pressure thereon. The sides of one polarity are linked with the conductor passing through the glass bead of the connector, the sides of the opposite polarity being fastened to the casing so that they are at ground potential. The recess is filled with a wax-like material thereby sealing the plates within. The mass of casing is great relatively to the mass of the plates whereby a pressure wave in the fluid adjacent the recessed wall deforms the plates so that the magnitude of resulting electrical potential between the plate sides is a function of the amplitude of the wave.

A feature of the invention is the application of external threads to the outer cylindrical surface of the casing to engage matching internal threads in an aperture in one end of an oil filled housing. A flexible diaphragm is fastened to the opposite end of the housing by means of a bellows to allow relative movement therebetween so that the diaphragm averages the pressure in the medium adjacent the outer surface of the diaphragm.

These and other objects, aspects and features of the invention will be apparent from the following description of specific embodiments thereof referring to a drawing wherein Fig. 1 is a plan view of one embodiment of the invention;

Fig. 2 is a cross-sectional view on line 2—2 of Fig. 1;

Fig. 3 is an enlarged fragmentary cross-section on line 2—2 of Fig. 1 showing the means of attaching a coaxial cable to the gauge;

Fig. 4 is an enlarged fragmentary cross-section of a piezoelectric element; and

Fig. 5 is an elevation view in partial section of another embodiment of the invention.

In the particular embodiment of the invention chosen for the purpose of illustration, the pressure gauge 10 comprises a plurality of piezoelectric elements or plates such as the four tourmaline discs 11a, 11b, 11c and 11d mounted coaxially with one side of the disc 11a resting upon the bottom of a circular recess 12 which is bored in one end 13 of a metal casing 14 so that the sides of the respective discs 11 are parallel with the casing end 13. When a tourmaline crystal is cut so that the ends of the resulting disc are perpendicular to the polar or C axis of the crystal, such ends develop charges of the opposite polarity whenever the crystal is subjected to a hydrostatic pressure. Although it is possible to predict the polarity of the charges upon the respective ends by a study of the crystalline structure it is usually more expedient to empirically determine the polarity by a simple electrical test with an electroscope.

Although tourmaline crystals are preferred because of their superior mechanical strength and chemical stability as well as relatively high linear electrical response to variations in pressure, other materials, for example, lithium sulfate monohydrate ($Li_2SO_4 \cdot H_2O$) which exhibit electrical charges of opposite polarity on different sides thereof whenever such materials are subjected to a hydrostatic pressure, may be used for the discs 11a, 11b, 12a and 12b.

To provide a means for attaching a coaxial cable (Fig. 3) leading to the recording or indicating instruments (not shown) a nipple 15 projects normally from the opposite end 16 of the casing 14. Centrically located in the nipple 15 is an aperture 17 which extends through the casing 14 to the bottom of the recess 12 adjacent the tourmaline disc 11a. Located within the aperture 17 is a fluid-tight connector 18 comprising a glass bead 19 having an electrical conductor 21 passing axially therethrough. A flanged metal sleeve or eye 22 is fused to the outside of the glass bead 19. A fused metal joint, for example soldered or brazed, fastens the flange of the sleeve 22 to an annular step 24 which projects from the wall of the aperture 17.

The inner conductor 15b of the coaxial cable is soldered to the conductor 21 which passes through the glass bead 19. To connect the outer conductor 15c, two screws 26 project through the clearance holes in a flange 27 attached to the coaxial cable to engage the respective holes 28 (Fig. 2) tapped into the end of the nipple 15. To prevent mechanical strains from being imposed upon these electrical connections, a connector such as the sleeve 15a engages an external thread 29 cut in the outside of the nipple 15.

As is best shown in Fig. 4, silver layers 31a and 31b are ceramic plated on the respective sides of the tourmaline disc 11a. The silver in the layers 13 and 14 is carried in colloidal suspension by an organic binder which is painted upon the ends of the disc 11a. The binder is volatilized by baking the disc in an oven thereby leaving a thin tightly adhering film of pure silver. Silver may also be deposited by the decomposition of silver bearing salts or by electroplating over a graphite layer which is first coated upon the ends of the disc.

Whenever the disc 11a is deformed, the positive charges appearing on one side thereof are collected by the layer 31a, the negative charges upon the opposite side being collected in an analogous manner by the layer 31b. The remaining discs 11b, 11c, and 11d have similar silver layers plated on their respective sides for collecting the charges appearing thereupon.

As described above, the disc 11a rests in the recess with its positive layer 31a in intimate electrical contact with the bottom of the recess. The disc 11b is placed coaxially above disc 11a with its negative layer in contact with the negative layer 31b of the disc 11a. The discs 11c and 11d are arranged in an analogous manner above the discs 11a and 11b so that the outside silver layers of the disc stack have a positive charge thereupon and the remaining silver layers abut layers having a similar charge.

The uppermost positive layer of the disc 11d is connected to the casing 14 by means of a lead 32, one end of which is soldered to the silver layer, the other end being similarly fastened to the wall of the recess 12. The abutting positive layers between the discs 11b and 11c are connected to the casing 14 in an analogous manner by the lead 33. As the positive layer 31a of the disc 11a rests upon the bottom of the recess 12, the casing 14 acts as a common terminal for all the positive silver layers. The negative abutting layers between the discs 11a and 11b and between the discs 11c and 11d are connected by the wires 34 and 36 respectively to the conductor 21 which passes through the glass bead 19. The junction of the wires 21, 34 and 36 is soldered so that the discs 11a, 11b, 11c and 11d are electrically connected in parallel, the soldered joint 37 comprising a common junction for the negatively charged layers.

To prevent shifting of the discs 11a—11d and to provide electrical insulation, a wax-like material 38, for example a paraffin base wax, is used to fill the recess 12. This material 38 also protects the discs 11a—11d from physical injury and mechanically transmits any pressure changes in the fluid adjacent the recessed end 13 of the casing 14.

The above described gauge 10 can be used to measure pressure variations in either a gas or a liquid. For example, the pressure exerted on the hull of a ship by an underwater explosion is measured by engaging the external threads 39 of the casing 14 with internal threads in an aperture in the hull so that the gauge end 13 projects outwardly. One end of the coaxial cable is connected to the nipple 15 in the manner described heretofore. The other end of the cable is coupled to the input terminals of a vacuum tube amplifier which multiplies the minute potential appearing across the tourmaline discs 11 sufficiently to drive a conventional indicating or recording oscillograph.

When the explosion occurs, the force exerted thereby is transmitted through the water to exert a force upon wax 38 and therefore upon the discs 11. As the electrical charge across the discs is proportional to the magnitude of this hydrostatic force, the trace upon the oscillograph indicates the magnitude thereof as a function of time i. e. the wave shape of the pressure transmitted upon the ship's hull.

It is apparent that by proper selection of materials and dimensioning of the gauge, it may be used in any of a great variety of applications wherein it is necessary to measure instantaneous pressures, for example in the wall of a pipe to indicate the gaseous or liquid static pressure therein; or in the cylinder head of an internal combustion engine to measure the head pressure.

In Fig. 5 is shown another embodiment whereby it is possible to measure the pressure exerted by piled earth, the sides of excavations or the force transmitted through packed earth by an explosion. This embodiment comprises a housing 42 having an internal threaded aperture 41 in one end wherein are engaged the threads 39 of a gauge assembly 10. The opposite end of the housing 42 is enclosed by a thin flexible diaphragm 43 which is fastened to the housing by means of a flexible bellows 44. The interior of the housing 42 is completely filled with a mineral oil 46, for example Nujol, by means of the vent and fill plugs 45a and 45b so that any pressure variation in the fluid outside the diaphragm 43 is transmitted by means of the oil 46 to the surface of the paraffin 38 of the gauge 10. The use of a flexible diaphragm 43 integrates the pressure over a considerable area so that the effects of high localized forces such as are exerted by a stone or other projecting piece are minimized and the gauge 10 measures the average pressure over the entire diaphragm area.

It should be understood that the present disclosure is for the purpose of illustration only and that this invention includes all modifications and equivalents which fall within the scope of the appended claims.

I claim:

1. A piezoelectric gauge for measuring pressure transients in an adjacent medium comprising a metal casing having a recess in one wall thereof, an externally threaded nipple projecting normally from the opposite wall of said casing and having a centrically located aperture extending to said recess, a fluid-tight electrical connector including a glass bead having a conductor passing axially therethrough and a metal sleeve fused to the outer surface thereof, a fused metal joint fastening said sleeve to the inner surface of said nipple, said conductor and said nipple being adapted to mate with a coaxial cable connector, a plurality of piezoelectric elements mounted in said recess and electrically connected in parallel, the terminal of one polarity being linked with the conductor of said connector and the terminal of the opposite polarity being fastened to said casing, and a wax-like material filling said recess and sealing said elements therein whereby the deformation of said elements by a pressure wave in the medium adjacent said recessed wall results in an electrical potential between said terminals the magnitude of which is a function of the amplitude of said wave.

2. A piezoelectric gauge for measuring pressure transients in an adjacent medium comprising an oil filled housing having an aperture in one end thereof, a diaphragm covering the opposite end of the housing, a flexible connection between said diapghragm and said housing, a metal casing having a recess in one wall thereof and an external surface engaging said housing aperture, an electrical connector positioned in another wall of said casing adjoining said recess, a plurality of piezoelectric elements mounted in said recess and electrically connected in parallel, the terminal of one polarity being linked with said connector and the terminal of the opposite polarity being fastened to said casing, and a wax-like material filling said recess and sealing said elements therein whereby the deformation of said elements by a pressure wave in the medium adjacent the outer surface of said diaphragm results in an electrical potential between said terminals the magnitude of which is a function of the amplitude of said wave.

3. A piezoelectric gauge for measuring pressure transients in an adjacent medium comprising a cylindrical metal casing having a recess in one end thereof and an externally threaded surface adapted to engage the internal thread of an aperture in a mounting, an externally threaded nipple projecting normally from the opposite end of said casing and having a centrically located aperture extending to said recess, a fluid-tight electrical connector including a glass bead having a conductor passing axially therethrough and a metal sleeve fused to the outer surface thereof, a fused metal joint fastening said sleeve to the inner surface of said nipple, said conductor and said nipple being adapted to mate with a coaxial cable connector, a plurality of piezoelectric plates each having two parallel sides and mounted in said recess with said sides parallel with the recessed end of said casing, a silver layer plated on each of the respective sides, the plates being arranged so that the contacting sides of adjacent plates are of the same polarity, the sides of one polarity being linked with said connector and the sides of the opposite polarity being fastened to said casing, and a wax-like material filling said recess and sealing said plates therein, the mass of said casing being great relatively to the mass of said plates whereby the deformation of said plate by a pressure wave in the medium adjacent said recessed wall results in an electrical potential between the sides of said plates the magnitude of which is a function of the amplitude of said wave.

4. A piezoelectric gauge for measuring pressure transients in an adjacent medium comprising an oil filled housing having a threaded aperture in one end thereof, a diaphragm covering the opposite end of the housing, a flexible bellows connecting said diaphragm to said housing, a cylindrical metal casing having a recess in one end thereof and an externally threaded surface adapted to engage the threads of the aperture in said housing, an externally threaded nipple projecting normally from the opposite end of said casing and having a centrically located aperture extending to said recess, a fluid-tight connector including a glass bead having a conductor passing axially therethrough and a metal sleeve fused to the outer surface thereof, a fused metal joint fastening said sleeve to the wall of said nipple aperture, said conductor and said nipple being adapted to mate with a coaxial cable connector, a plurality of piezoelectric plates each having two parallel sides and mounted in said recess with said sides parallel with the recessed end of said casing, a silver layer plated on each of the respective sides, the plates being arranged so that the contacting sides of the adjacent plates are of the same polarity, the sides of one polarity being linked with said connector and the sides of the opposite polarity being fastened to said casing, and a wax-like material filling said recess and sealing said plates therein, the mass of said casing being great relatively to the mass of said plates whereby the deformation of said plates by a pressure wave in the medium adjacent the outer surface of said diaphragm results in an electrical potential between the respective sides of said plates the magnitude of which is a function of the amplitude of said wave.

5. A piezoelectric gauge for measuring pressure transients in an adjacent medium, a cylindrical metal casing having a recess in one end thereof and an externally threaded surface adapted to engage the internal thread of an aperture in a mounting, an externally threaded nipple projecting normally from the opposite end of said casing and having a centrically located aperture extending to said recess, a fluid-tight electrical connector including a glass bead having a conductor passing axially therethrough and a metal sleeve fused to the outer surface thereof, a fused metal joint fastening said sleeve to the inner surface of said nipple, said conductor and said nipple being adapted to mate with a coaxial cable connector, a plurality of tourmaline plates each having two parallel sides and mounted in said recess with said sides parallel with the recessed end of said casing, a silver layer plated on each of the respective sides, the plates being arranged so that the contacting sides of adjacent plates are of the same polarity, the sides of one polarity being linked with said connector and the sides of the opposite polarity being fastened to said casing, and a wax-like material filling said recess and sealing said plates therein, the mass of said casing being great relatively to the mass of said plates whereby the deformation of said plate by a pressure wave in the medium adjacent said recessed wall results in an electrical potential between the sides of said plates the magnitude of which is a function of the amplitude of said wave.

6. A piezoelectric gauge for measuring pressure transients in an adjacent medium comprising an oil filled housing having a threaded aperture in one end thereof, a diaphragm covering the opposite end of the housing, a flexible bellows connecting said diaphragm to said housing, a cylindrical metal casing having a recess in one end thereof and an externally threaded surface adapted to engage the threads of the aperture in said housing, an externally threaded nipple projecting normally from the opposite end of said casing and having a centrically located aperture extending to said recess, a fluid-tight connector including a glass bead having a conductor passing axially therethrough and a metal sleeve fused to the outer surface thereof, a fused metal joint fastening said sleeve to the wall of said nipple aperture, said conductor and said nipple being adapted to mate with a coaxial cable connector, a plurality of tourmaline plates each having two parallel sides and mounted in said recess with said sides parallel with the recessed end of said casing, a silver layer plated on each of the respective sides, the plates being arranged so that the contacting sides of the adjacent plates are of the same polarity, the sides of one polarity being linked with said connector and the sides of the opposite polarity being fastened to said casing, and a wax-like material filling said recess and sealing said plates therein, the mass of said casing being great relatively to the mass of said plates whereby the deformation of said plates by a pressure wave in the medium adjacent the outer surface of said diaphragm results in an electrical potential between the respective sides of said plates, the magnitude of which is a function of the amplitude of said wave.

CLIFFORD FRONDEL.

REFERENCES CITED

The following references are of record in the file of this patent:

UNITED STATES PATENTS

| Number | Name | Date |
| --- | --- | --- |
| 1,121,986 | Davison | Dec. 22, 1914 |
| 1,495,429 | Nicholson | May 27, 1924 |
| 1,766,042 | Nicholson | June 24, 1930 |
| 1,939,302 | Heaney | Dec. 12, 1933 |
| 2,374,637 | Hayes | Apr. 24, 1945 |
| 2,384,465 | Harrison | Sept. 11, 1945 |
| 2,402,531 | Christian | June 25, 1946 |
| 2,427,348 | Bond et al. | Sept. 16, 1947 |
| 2,433,383 | Mason et al. | Dec. 30, 1947 |
| 2,447,333 | Hayes | Aug. 17, 1948 |
| 2,456,294 | Massa | Dec. 14, 1948 |